US011662252B2

(12) United States Patent
Nagahara

(10) Patent No.: US 11,662,252 B2
(45) Date of Patent: May 30, 2023

(54) PRINTING APPARATUS AND METHOD FOR GENERATING COLOR CHART DATA

(71) Applicant: SEIKO EPSON CORPORATION, Tokyo (JP)

(72) Inventor: Atsushi Nagahara, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/656,252

(22) Filed: Mar. 24, 2022

(65) Prior Publication Data

US 2022/0307906 A1    Sep. 29, 2022

(30) Foreign Application Priority Data

Mar. 26, 2021    (JP) .............................. JP2021-052869

(51) Int. Cl.
*G01J 3/52* (2006.01)
*B41J 11/00* (2006.01)
*H04N 1/60* (2006.01)
*G01J 3/46* (2006.01)

(52) U.S. Cl.
CPC .............. *G01J 3/52* (2013.01); *B41J 11/002* (2013.01); *G01J 3/462* (2013.01); *H04N 1/6033* (2013.01)

(58) Field of Classification Search
CPC . G01J 3/52; G01J 3/462; B41J 11/002; H04N 1/6033; H04N 1/00045
USPC ............ 358/1.9, 3.27, 504, 518; 399/49, 72; 347/102
See application file for complete search history.

(56) References Cited

U.S. PATENT DOCUMENTS

| | | | | |
|---|---|---|---|---|
| 2007/0291291 A1* | 12/2007 | Vilar | .................... | H04N 1/3878 358/1.9 |
| 2013/0135408 A1* | 5/2013 | Masuda | ............... | B41J 11/0022 347/102 |
| 2013/0135636 A1* | 5/2013 | Kosuge | .................. | B41J 13/009 358/1.9 |
| 2018/0359391 A1 | 12/2018 | Tanase et al. | | |

FOREIGN PATENT DOCUMENTS

| | | |
|---|---|---|
| JP | 2010-240996 A | 10/2010 |
| JP | 2019-003240 A | 1/2019 |

* cited by examiner

*Primary Examiner* — Jamares Q Washington
(74) *Attorney, Agent, or Firm* — Workman Nydegger

(57) ABSTRACT

A printing apparatus includes a control unit configured to generate color chart data, a transport unit configured to intermittently transport a medium, a printing unit configured to print a colorimetric patches on a processing unit region, a drying unit configured to dry the processing unit region, and a colorimetric unit configured to measure a color of the colorimetric patches in the processing unit region subjected to the drying, wherein the control unit is configured to acquire, based on a printing setting, a drying holding time during which the processing unit region is held at the drying unit, calculate a color-measurable patch number which is measurable by the colorimetric unit within the drying holding time, and generate the color chart data for printing a number of the colorimetric patches in the processing unit region, the number being less than or equal to the color-measurable patch number.

9 Claims, 10 Drawing Sheets

40

| SPOT COLOR NAME | L* | a* | b* |
|---|---|---|---|
| R100 | 60 | 64 | 35 |
| B100 | 33 | 25 | -60 |
| Y100 | 90 | -2 | 90 |
| O100 | 85 | 40 | 67 |
| G100 | 72 | -63 | 57 |
| ⋮ | ⋮ | ⋮ | ⋮ |

| MEDIUM TYPE | DRYING RETAINABLE TIME |
|---|---|
| COATED PAPER | 24 SECONDS |
| LABEL PAPER | *** |
| PLAIN PAPER | *** |
| ⋮ | ⋮ |

FIG. 4B

| PRINTING FRAME | PRINT | DRY | WAIT | COLORIMETRY |
|---|---|---|---|---|
| F1 | F1 | | | |
| F2 | F2 | F1 | | |
| F3 | F3 | F2 | F1 | |
| F4 | F4 | F3 | F2 | F1 |
| F5 | F5 | F4 | F3 | F2 |
| F6 | F6 | F5 | F4 | F3 |
| ⋮ | ⋮ | ⋮ | ⋮ | ⋮ |
| F10 | F10 | F9 | F8 | F7 |
| | | F10 | F9 | F8 |
| | | | F10 | F9 |
| | | | | F10 |

FIG. 6

PRINTING APPARATUS AND METHOD FOR GENERATING COLOR CHART DATA

The present application is based on, and claims priority from JP Application Serial Number 2021-052869, filed Mar. 26, 2021, the disclosure of which is hereby incorporated by reference herein in its entirety.

BACKGROUND

1. Technical Field

The present disclosure relates to a printing apparatus and a method for generating color chart data.

2. Related Art

A process for determining a condition capable of realizing a spot color in a printing apparatus by printing a color patch and visually evaluating the printed color patch with a colorimeter or visual evaluation is disclosed (see JP-A-2019-3240).

Further, a configuration is disclosed in which a colorimeter is provided downstream of a head that discharges ink and prints it on paper, and a colorimeter measures a color of a test pattern printed on the head (see JP-A-2010-240996).

In a printing apparatus configured to transport a printing medium and perform printing of a color patch on a printing medium and colorimetry of the patch after printing, a configuration is assumed in which the printed patch is dried by a drying furnace prior to colorimetry. In this case, when a large amount of time is required for the colorimetry due to the number of patches to be measured for color and the colorimetric capability, the patch located in the drying furnace upstream of the transport than the patch to be subjected to the colorimetry may be held at the drying oven for more than a time required for drying until the colorimetry of the downstream patch has been finished. As a result, there is a risk that the printed medium on which the patch is printed placed in the drying furnace may be damaged by heat causing wrinkles or stretching, which may deteriorate the quality of the printed material.

SUMMARY

A printing apparatus includes a control unit configured to generate color chart data for printing a color chart including a plurality of colorimetric patches corresponding to a plurality of spot colors, a transport unit configured to intermittently transport a printing medium in a transport direction, a printing unit configured to print the colorimetric patches on a processing unit region aligned along the transport direction in the printing medium by attaching a color material to the printing medium based on the color chart data, a drying unit configured to dry the processing unit region in which the colorimetric patches are printed, and a colorimetric unit configured to measure a color of the colorimetric patches in the processing unit region subjected to the drying, wherein the control unit is configured to acquire, based on a printing setting, a drying holding time during which the processing unit region is held at the drying unit, calculate a color-measurable patch number that is a number of the colorimetric patches a color of which is measurable by the colorimetric unit within the drying holding time, and generate the color chart data for printing a number of the colorimetric patches in the processing unit region, the number being less than or equal to the color-measurable patch number.

A printing apparatus includes a control unit configured to generate color chart data for printing a color chart including a plurality of colorimetric patches corresponding to a plurality of spot colors, a transport unit configured to intermittently transport a printing medium in a transport direction, a printing unit configured to print the colorimetric patches on a processing unit region aligned along the transport direction in the printing medium by attaching a color material to the printing medium based on the color chart data, a drying unit configured to dry the processing unit region in which the colorimetric patches are printed, a colorimetric unit configured to measure a color of the colorimetric patches in the processing unit region subjected to the drying, and a storage unit configured to store a correspondence relationship between a type of the printing medium and a drying holdable time that is a time during which the printing medium is configured to be held at the drying unit in accordance with the type of the printing medium, wherein the control unit is configured to acquire the type of the printing medium from a printing setting to read out the drying holdable time corresponding to the type of the printing medium from the storage unit, calculate a color-measurable patch number that is a number of the colorimetric patches a color of which is measurable by the colorimetric unit within the drying holdable time, generate the color chart data for printing a number of the colorimetric patches in the processing unit region, the number being less than or equal to the color-measurable patch number, and set a drying holding time during which the processing unit region is held at the drying unit to be less than or equal to the drying holdable time and greater than or equal to a time required for colorimetry of a number of the colorimetric patches printed in the processing unit region, the colorimetry being performed by the colorimetric unit.

A method for generating color chart data for printing a color chart including a plurality of colorimetric patches corresponding to a plurality of spot colors, the method includes acquiring, based on a printing setting, a drying holding time during which a processing unit region in a printing medium is held at a drying unit, the processing unit region being subjected to each of printing of the colorimetric patches based on the color chart data by a printing unit, drying by the drying unit, and colorimetry by a colorimetric unit in this order, calculating a color-measurable patch number that is a number of the colorimetric patches a color of which is measurable by the colorimetric unit within the drying holding time, and generating the color chart data for printing a number of the colorimetric patches in the processing unit region, the number being less than or equal to the color-measurable patch number.

A method for generating color chart data for printing a color chart including a plurality of colorimetric patches corresponding to a plurality of spot colors, the method includes when a region in a printing medium to be subjected to each of printing of the colorimetric patches based on the color chart data by a printing unit, drying by a drying unit, and colorimetry by a colorimetric unit in this order, is a processing unit region, acquiring a type of the printing medium from a printing setting to read out a drying holdable time corresponding to the acquired type of the printing medium from a storage unit configured to store a correspondence relationship between the type of the printing medium and the drying holdable time that is a time during which the printing medium is configured to be held at the drying unit in accordance with the type of the printing medium, calculating a color-measurable patch number that is a number of the colorimetric patches a color of which is measurable by the colorimetric unit within the drying holdable time, generating the color chart data for printing a number of the colorimetric patches in the processing unit region, the number being less than or equal to the color-measurable patch number, and setting a drying holding time during which the processing unit region is held at the drying unit to be less than or equal to the drying holdable time and greater than or equal to a time required for colorimetry of a number of the colorimetric patches printed in the processing unit region, the colorimetry being performed by the colorimetric unit.

BRIEF DESCRIPTION OF THE DRAWINGS

FIG. 4A is a diagram illustrating an example of colorimetric patch information, and FIG. 4B is a diagram illustrating an example of medium characteristic information.

FIG. 6 is a diagram illustrating, in a table format, a state in which a correspondence between each frame and the processing transitions.

DESCRIPTION OF EXEMPLARY EMBODIMENTS

Exemplary embodiments of the present disclosure will be described below with reference to the accompanying drawings. Note that each of the drawings is merely illustrative for describing the exemplary embodiment. Since the drawings are illustrative, proportions and shapes may not be precise, match each other, or some may be omitted.

1. APPARATUS CONFIGURATION

Figure 1:
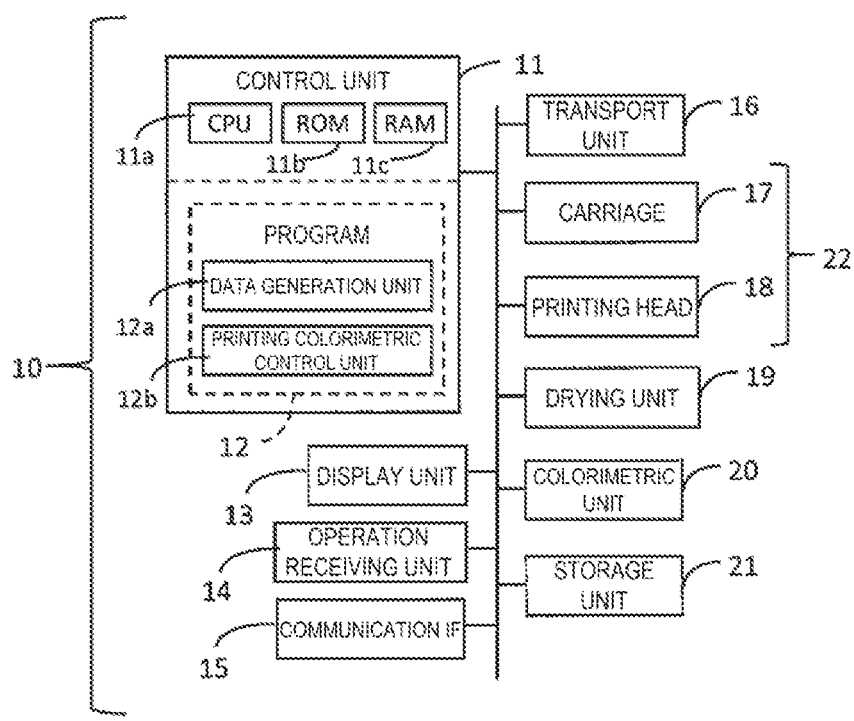
FIG. 1 is a block diagram illustrating an apparatus configuration in a simplified manner.

FIG. 1 illustrates a configuration of a printing apparatus 10 according to the exemplary embodiment, in a simplified manner.

The printing apparatus 10 includes a control unit 11, a display unit 13, an operation receiving unit 14, a communication IF 15, a transport unit 16, a carriage 17, a printing head 18, a drying unit 19, a colorimetric unit 20, a storage unit 21, etc. IF is an abbreviation for interface. The control unit 11 is configured to include, as a processor, one or more ICs including a CPU 11a, a ROM 11b, a RAM 11c, etc, another non-volatile memory, etc.

In the control unit 11, the processor, that is, the CPU 11a, executes arithmetic processing in accordance with one or more programs 12 stored in the ROM 11b or other memory, using the RAM 11c, etc. as a work area, to realize functions such as a data generation unit 12a and a printing colorimetric control unit 12b. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13.

The display unit 13 and the operation receiving unit 14 may be part of the configuration of the printing apparatus 10, or may be peripheral devices externally coupled to the printing apparatus 10. The communication IF 15 is a generic term for one or a plurality of IFs for coupling the printing apparatus 10 with the outside in a wired or wireless manner, in accordance with a predetermined communication protocol including a known communication standard provide.

The transport unit 16 is a means for transporting the printing medium along a transport direction, and includes a roller, a motor for rotating the roller, etc.

The printing head 18 discharges ink as a coloring material or other liquid to the printing medium by an inkjet method to perform printing.

The carriage 17 is a mechanism capable of reciprocating along a predetermined main scanning direction by receiving power from a motor (not illustrated). The printing head 18 is mounted on the carriage 17. Accordingly, the printing head 18 reciprocates along the main scanning direction with the carriage 17. The printing head 18 and the carriage 17 constitute a printing unit 22.

The drying unit 19 dries the printing medium after printing by the printing unit. The drying unit 19 has a heater, for example, and dries a target by heat emitted by the heater. The colorimetric unit 20 is a means for measuring a color of the target. The colorimetric unit 20 measures colors of the printing result on the printing medium after drying by the drying unit 19. The format of the colorimetric values generated and output by the colorimetric unit 20 as the colorimetric result is, for example, an L*a*b* value according to the L*a*b* color space defined by the CIE (International Commission on Illumination) or a combination of the graduation values of each red (R), green (G), and blue (B).

The notation of "*" is omitted below.

The storage unit 21 is constituted by a storage device such as a hard disk drive or a solid state drive, for example. The storage unit 21 may include the ROM 11b and other memory included in the control unit 11. Furthermore, the storage unit 21 may be interpreted as a part of the control unit 11. The storage unit 21 stores various information necessary to control the printing apparatus 10 in addition to the colorimetric patch information, the printing setting, and the medium characteristic information, for example.

The configuration of the printing apparatus 10 illustrated in FIG. 1 may be realized by a single printer, or may be realized by a plurality of communicatively coupled devices.

In other words, the printing apparatus 10 may be the printing system 10 in actuality. The printing system 10 includes, for example, an information processing device that functions as the control unit 11 and the storage unit 21, and a printer that includes the transport unit 16, the printing unit 22, the drying unit 19, and the colorimetric unit 20. By such a printing apparatus 10 or a printing system 10, the printing colorimetry method and the color chart data generation method of the present exemplary embodiment are realized.

Figure 2:
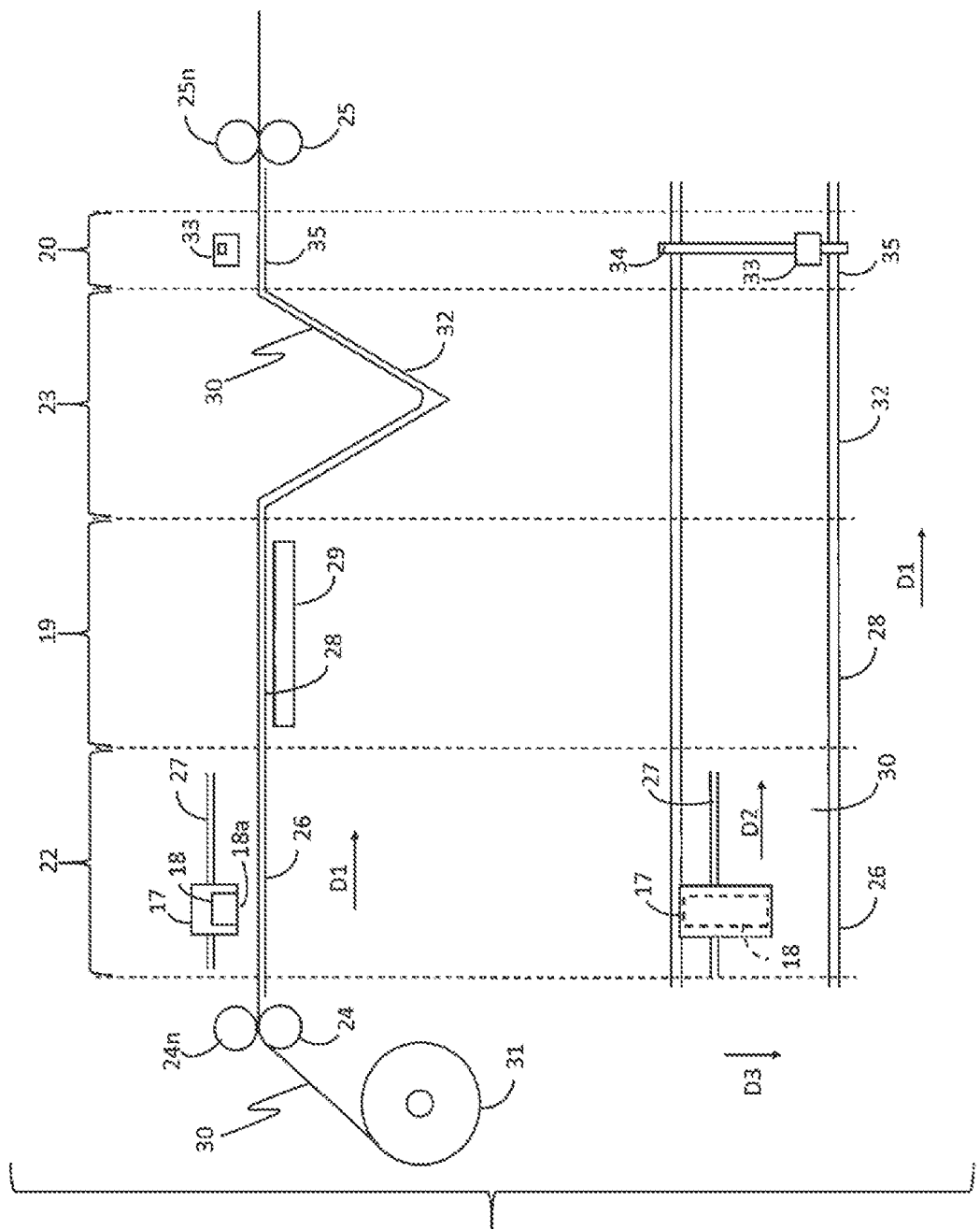
FIG. 2 is a diagram illustrating a specific example of a structure including a printing unit, a drying unit, a colorimetric unit, etc.

FIG. 2 illustrates a specific example of a structure including the printing unit 22, the drying unit 19, the colorimetric unit 20, etc. In an upper row of FIG. 2, the specific example is illustrated using a perspective orthogonal to a transport direction D1 of a printing medium 30. Furthermore, the specific example is illustrated in a bottom row of FIG. 2 by a perspective from above. Note that, in consideration of the visibility, some of the configurations illustrated in one of the upper row and the bottom row in FIG. 2 may be omitted on the other hand. According to FIG. 2, the printing unit 22, the drying unit 19, and the colorimetric unit 20 are disposed along the downstream direction from the upstream in the transport direction D1. Upstream and downstream of the orientation of the transport path including the transport direction D1 is referred to simply as upstream and downstream. Furthermore, a transport amount adjustment unit 23 is disposed between the drying unit 19 and the colorimetric unit 20.

A first driving roller 24 is provided at an upstream position of the printing unit 22, and a second driving roller 25 is provided at a downstream position of the colorimetric unit 20. In an example of the upper row in FIG. 2, the first driving roller 24 rotates clockwise to transport the printing medium 30 downstream. A first nip roller 24n is provided for the first driving roller 24. The first nip roller 24n abuts on the printing medium 30 to sandwich the printing medium 30 between the first nip roller 24n and the first driving roller 24.

The second driving roller 25 rotates clockwise to transport the printing medium 30 further downstream. A second nip roller 25n is provided for the second driving roller 25. The second nip roller 25n abuts on the printing medium 30 to sandwich the printing medium 30 between the second nip roller 25n and the second driving roller 25. These rollers constitute at least a portion of the transport unit 16. However, a number and arrangement of a specific means such as rollers that the transport unit 16 has for transporting the printing medium 30 is not limited to the mode illustrated in FIG. 2. For example, a third driving roller and a third nip roller (not illustrated) that assist with the first driving roller 24 may be provided between the drying unit 19 and the transport amount adjustment unit 23. In the present exemplary embodiment, the printing medium 30 is previously sandwiched between the first driving roller 24 and the first nip roller 24n, and is sandwiched between the second driving roller 25 and the second nip roller 25n.

The printing medium 30 is, for example, elongated continuous paper that is fed toward the first driving roller 24 from roll paper 31 held at a position upstream of the first driving roller 24. The print medium 30 may be a medium made of a material other than paper. In addition, the printing medium 30 may be a double-structure medium including a sheet called a label, a seal, etc., and a kitchen paper to which a sheet is affixed with an adhesive.

The printing unit 22 has a printing platen 26, a carriage 17 and a printing head 18 disposed above the printing platen 26. As can be seen from FIG. 2, the printing head 18 is mounted on the carriage 17. The printing platen 26 supports the printing medium 30 transported by the first driving roller 24 from below.

The printing head 18 has a plurality of nozzles, and can discharge the ink from each of the plurality of nozzle. The printing head 18 can discharge a plurality of colors of ink, such as cyan (C), magenta (M), yellow (Y), and black (K). Of course, the ink discharged by the printing head 18 is not limited to CMYK ink. Each nozzle of the printing head 18 is exposed to the nozzle surface 18a facing the printing platen 26 of the printing head 18, and the printing head 18 discharges ink from the nozzle or does not discharge ink based on the print data. The ink discharged by the nozzle is also referred to as an ink droplet, or as a dot.

The reference sign D2 denotes a main scanning direction D2 of the carriage 17. According to the example of FIG. 2, the transport direction D1 and the main scanning direction D2 are parallel. In the present exemplary embodiment, a parallel or orthogonal expression is not limited to a strict parallel or orthogonal manner, and is meant to include a degree of error that can occur in a product. A direction D3 orthogonal to the transport direction D1 is referred to as a width direction D3. A guide rail 27 that is parallel with the main scanning direction D2 is provided above the printing platen 26, and the carriage 17 can reciprocate along the guide rail 27.

Additionally, the carriage 17 can move along the width direction D3. Although not illustrated in the drawings, a mechanism such as another guide rail is provided for reciprocating a unit including the carriage 17 and the guide rail 27 along the width direction D3. The control unit 11 controls such movement of the carriage 17 in the main scanning direction D2 and the width direction D3. In other words, the carriage 17 on which the printing head 18 is mounted can move in two dimensions in a plane parallel to a surface of the printing medium 30 supported by the printing platen 26.

The operation of discharging ink by the printing head 18 along the movement of the carriage 17 along the main scanning direction D2 is referred to as main scanning. The main scanning is also referred to as a pass. The movement of the carriage 17 along the width direction D3 may be referred to as sub scanning, and the width direction D3 may be referred to as a sub scanning direction. By repeating the main scanning and the sub scanning, printing is performed on a region of the printing medium 30 supported by the printing platen 26.

The drying unit 19 includes a drying platen 28 that supports the printing medium 30 following the printing platen 26 downstream of the printing platen 26. In the drying unit 19, for example, a heater 29 is disposed below the drying platen 28, and a region supported by the drying platen 28 on the printing medium 30 is dried by heat emitted by the heater 29. Although not illustrated in the drawings, a configuration is possible in which, for example, a heater is disposed above the drying platen 28, and the printing medium 30 supported by the drying platen 28 is dried using an upper and lower heater. Furthermore, the drying unit 19 may have a configuration in which the printing medium 30 supported by the drying platen 28 is dried by hot air. The drying unit 19 may be referred to as a drying oven.

The transport amount adjustment unit 23 has a holding cavity platen 32 downstream of the drying platen 28, following the drying platen 28. The holding cavity platen 32 is a transport path recessed below the printing platen 26 and the drying platen 28, and supports the printing medium 30. The printing medium 30 transported by the first driving roller 24 is held at the holding cavity platen 32 after being dried in the drying unit 19. Note that the transport amount adjustment unit 23 may not be provided with the holding cavity platen 32. In this case, the printing medium 30 in the transport amount adjustment unit 23 is held in the air in a state in which the printing medium 30 is deflected in the gravitational direction by a predetermined amount without being supported. Additionally, in order to control the amount of deflection, a sensor or a dancer roller may be provided that detects the amount of deflection.

The colorimetric unit 20 includes a colorimetric platen 35 that supports the holding cavity platen 32 followed by the printing medium 30 downstream of the holding cavity platen 32. The colorimetric platen 35 may be understood as a surface having the same height as, or substantially the same as, the printing platen 26 and the drying platen 28. The colorimetric unit 20 includes a colorimeter 33 disposed above the colorimetric platen 35. A guide rail 34 that is parallel with the width direction D3 is provided above the colorimetric platen 35, and the colorimeter 33 can reciprocate along the guide rail 34. As described below, the colorimeter 33 measures colors of the colorimetric patch printed on the printing medium 30.

The control unit 11 is capable of separately controlling the rotation of each of the first driving roller 24 and the second driving roller 25 included in the transport unit 16. The first driving roller 24 is responsible for transporting the printing medium 30 to the transport amount adjustment unit 23. On the other hand, the second driving roller 25 is responsible for transporting the printing medium 30 in the transport amount adjustment unit 23 and the colorimetric unit 20 further downstream. The first driving roller 24 and the second driving roller 25 can intermittently transport the printing medium 30 in the transport direction D1. In FIG. 2, a configuration downstream from the second driving roller 25 is not described, but the post-colorimetric printing medium 30 transported downstream from the second driving roller 25 is wound and collected by a winding roller, for example, and collected on a cutter.

2. FIRST EXEMPLARY EMBODIMENT

Figure 3:
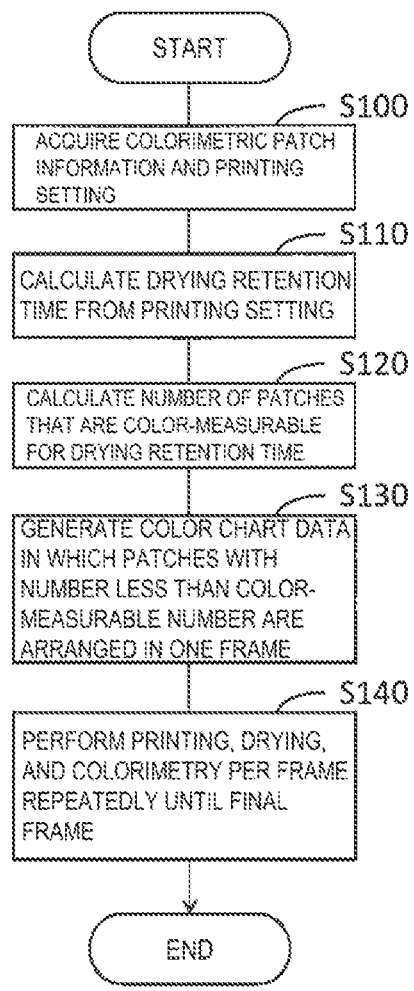
FIG. 3 is a flowchart illustrating printing colorimetric processing of a color chart according to a first exemplary embodiment.

FIG. 3 illustrates printing colorimetric processing of a color chart executed by the control unit 11 according to the program 12 in the first exemplary embodiment by a flowchart. In the flowchart of FIG. 3, steps S100 to S130 correspond to a method of generating color chart data.

In step S100, the data generation unit 12a of the control unit 11 acquires the colorimetric patch information and the printing setting. The colorimetric patch information is stored in the storage unit 21 in advance. Furthermore, the printing setting is also stored in the storage unit 21 by the content determined in advance by the user operation. Thus, the data generation unit 12a may acquire the colorimetric patch information and the printing setting from the storage unit 21. The printing setting referred to here is a setting for printing a color chart. Alternatively, the printing setting is a setting for printing various images that are not limited to the color chart.

According to the printing setting, a type of the printing medium 30 used for printing the color chart, a printing method for one frame, etc. are prescribed. In the present exemplary embodiment, a processing unit region serving as a unit for each process such as printing, drying, and colorimetry is referred to as a "frame". The frame is a region aligned along the transport direction D1 in the printing medium 30. The frames aligned along the transport direction D1 may be coupled to each other or may have gaps therebetween. The size of one frame (frame size) is predetermined. The length of one frame in the transport direction D1 is referred to as a frame length, and the length of one frame in the width direction D3 is referred to as a frame width. Simply, a width of the medium, which is a length in the width direction D3 of the printing medium 30, may be a frame width.

FIG. 4A illustrates colorimetric patch information 40 acquired from the storage unit 21 by the data generation unit 12a in step S100. The colorimetric patch information 40 is information defining the Lab values for a plurality of spot colors. The spot color is a specific color for which high color reproducibility is required in the printing result, and the color thereof is evaluated by printing as a patch and then measure colors. In the present exemplary embodiment, 100 colorimetric patches corresponding to each of the 100 types of spot colors are printed on the printing medium 30 to create a so-called ICC profile. According to FIG. 4A, the Lab=(60, 64, 35) is defined for the spot color of "R100", for example.

In step S110, the data generation unit 12a calculates a "drying holding time" during which the frame is held at the drying unit 19 based on the printing setting acquired in step S100. In the first exemplary embodiment, it is assumed that a printing time for one frame=the dry holding time for one frame. Thus, the data generation unit 12a determines the printing time for one frame from the printing setting. For example, it is assumed that the printing setting is "coated paper, four passes". This means that one frame in the coated paper is printed in four passes. For example, the printing of one frame with four passes requires 12 seconds. Accordingly, the data generation unit 12a set that the drying holding time=12 (seconds).

The data generation unit 12a can determine the printing time for one frame in accordance with the printing setting in a predetermined calculation equation. Alternatively, the printing time for one frame in accordance with the printing setting is stored in the storage unit 21 in advance, and the data generation unit 12a may read out the printing time for one frame in accordance with the printing setting from the storage unit 21. In the present exemplary embodiment, various specific numerical values listed for the purpose of illustration are examples, and they do not narrow the scope of the present exemplary embodiment.

In step S120, the data generation unit 12a calculates a "color-measurable patch number", which is a number of color-measurable patches capable of being measured for color by the colorimetric unit 20 within the drying holding time. Here, the colorimetric performance of the colorimetric unit 20, such as how many colorimetric patches capable being measured for color by the colorimetric unit 20 per second, is stored in the storage unit 21 as information in advance.

Figure 5:
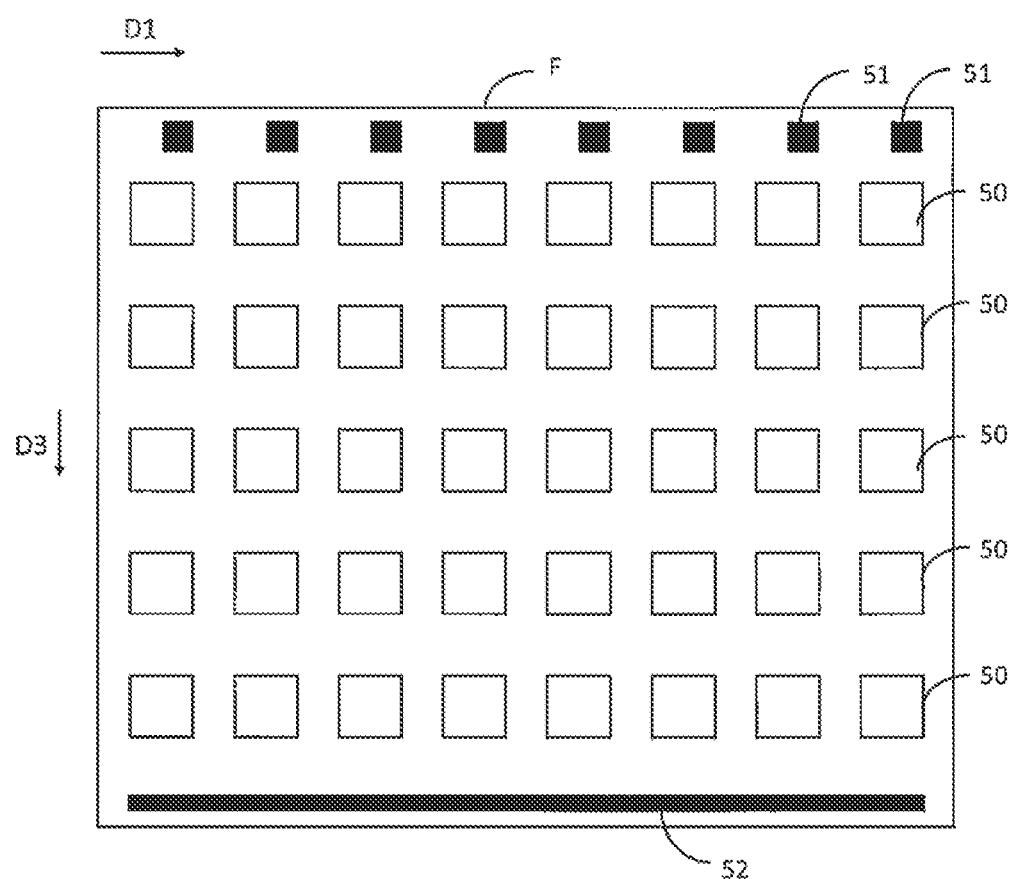
FIG. 5 is a diagram illustrating a frame on which a colorimetric patch having a frame maximum patch number is printed.

FIG. 5 illustrates one frame F of the printing medium 30 on which a plurality of colorimetric patches 50 are printed by the printing unit 22. One rectangle illustrated in the blank in the frame F is each colorimetric patch 50. Of course, the colorimetric patch 50 is actually colored, respectively. Since the size of the colorimetric patch 50 is a predetermined size and the frame size is also predetermined as described above, the maximum number of the colorimetric patches 50 that can be printed on one frame is also determined. The maximum number of the colorimetric patches that can be printed on one frame is hereinafter referred to as a "frame maximum patch number". In the example illustrated in FIG. 5, the colorimetric patch 50 having the frame maximum patch number is printed on the frame F. According to the example of FIG. 5, five colorimetric patches 50 are aligned in a single column along the width direction D3, and eight columns of such colorimetric patches 50 lie in eight columns along the transport direction D1, so that the frame maximum patch number=40.

As will be described in greater detail below, in the colorimetric unit 20, the colorimeter 33 measures colors of such one column of colorimetric patches 50 as a single set. Markings 51 and a colorimetric initiation bar 52 are also described below. The colorimeter 33 requires, for example, six seconds in the colorimetry of the colorimetric patches 50 in one column with 5 pieces, including the time required for movement along the width direction D3. In other words, in accordance with the colorimetric performance of the colorimetric unit 20, colors of five colorimetric patches 50 are measured at six seconds. In this case, when the drying holding time is 12 seconds as described above, the data generation unit 12a calculates that the color-measurable patch number=10.

In step S130, the data generation unit 12a generates color chart data for printing a number of colorimetric patches less than or equal to the color-measurable patch number in one frame. In this case, in a case where the total number of colorimetric patches to be printed is greater than the color-measurable patch number, the data generation unit 12a divides the total number of the colorimetric patches into groups of the colorimetric patches, a number of the colorimetric patches per the group being less than or equal to the color-measurable patch number, and generates the color chart data for printing, in group units, the color chart on each frame.

In the above example, the total number of colorimetric patches to be printed is 100, and the color-measurable patch number is 10. As such, the data generation unit 12a divides 100 colorimetric patches into 10 groups, and generates color chart data for printing a color chart with a total of 10 frames in which 10 colorimetric patches are arranged per frame. An aspect of the arrangement of the colorimetric patches in one frame is as illustrated in FIG. 5. The printing data for performing printing on one frame is also referred to as frame data. Accordingly, the color chart data for printing the color chart on 10 frames is a set of 10 frame data. The data generation unit 12a may reduce the number of colorimetric patches arranged per frame to be less than the color-measurable patch number, and increase the number of frames for printing a color chart composed of the total number of colorimetric patches.

The color chart data is print data for printing the colorimetric patch corresponding to the spot color on the printing head 18 in step S140. Accordingly, the data generation unit 12a converts the Lab values of the spot colors defined in the colorimetric patch information 40 acquired in step S100 into a CMYK table color system, which is a table color system of ink used by the printing head 18, and subject the data after the color conversion to halftone processing, thereby arranging the image of the colorimetric patch expressing the corresponding spot color with dots of CMYK ink in the color chart data.

In step S140, the printing colorimetric control unit 12b of the control unit 11 controls the transport unit 16, the printing unit 22, and the colorimetric unit 20, and repeats the series of processing of printing, drying, and colorimetry of the colorimetric patch based on the color chart data on the frame of the printing medium 30 until the final frame.

Step S140 is described with reference to the table, etc. illustrated in FIG. 6.

A "printing frame" in FIG. 6 means a frame to be printed on a colorimetric patch based on the color chart data. In addition, the number of 1, 2, 3 . . . following the reference sign F, which refers to the frame in FIG. 6, refers to the ordinal number of a frame to be printed based on the color chart data. FIG. 6 illustrates a case in which the color chart corresponding to the example described above is printed on 10 frames, and the frames F1, F2, F3, F4, F5, F6, F7, F8, F9, and F10 are sequentially printing frames.

FIG. 6 also illustrates how each frame is subject to processing when a frame is a printing frame. When the frame F1 is a printing frame, the frame F1 is of course intended for printing by the printing unit 22, and the other frame located upstream from the frame F1 is not subjected to any processing.

Of course, printing on the frame based on the color chart data follows the printing settings acquired in step S100. Here, a type of printing medium 30 specified in the printing setting is transported by the transport unit 16. As in the example described above, it is assumed that "four passes" are specified in the printing setting. In this case, the printing colorimetric control unit 12b prints the plurality of colorimetric patches 50 representing frame data corresponding to the frame in the color chart data on a printing frame that is stationary on the printing platen 26 by causing the carriage 17 and the print head 18 to perform the four passes and sub-scans between passes.

The time required for printing the plurality of colorimetric patches on a frame based on the color chart data is the drying holding time calculated in step S110. Accordingly, the printing colorimetric control unit 12b rotates the first driving roller 24 of the transport unit 16 to execute one-time "frame feeding" of the printing medium 30 in the transport direction D1 at the timing when the drying holding time has elapsed since the printing unit 22 starts printing on one printing frame. The frame feeding is a transport for moving the printing frame previously lying at the printing platen 26 onto the drying platen 28. Due to the frame feeding, the frame upstream of the printing frame moves onto the printing platen 26 and the frame lying at the drying platen 28 moves to the holding cavity platen 32. That is, a distance for moving a frame upstream of one of the printing frames onto the printing platen 26, a distance for moving a printing frame lying at the printing plan 26 onto the drying platen 28, and a distance for moving a frame lying at the drying platen 28 to the holding cavity platen 32 are transport distances of the printing medium 30 by the one-time frame feeding. After frame feeding, the printing colorimetric control unit 12b starts printing of a new printing frame on the printing unit 22.

As illustrated in FIG. 6, when printing on the frame F1 is completed, the frame F2 becomes a printing frame through the frame feeding. As a result, the frame F1 is held at the drying platen 28, and is subject to drying by the drying unit 19.

When the drying holding time has elapsed since the frame F2 becomes the printing frame, the frame F3 becomes the printing frame through the frame feeding. As a result, the frame F1 is held at the holding cavity platen 32 and waits for colorimetry, and the frame F2 is held at the drying platen 28 and is subject to drying. The "waiting" in FIG. 6 refers to a state in which the drying has ended and the colorimetry by the colorimetric unit 20 is waiting at the holding cavity platen 32. In this way, the frame feeding corresponds to an "intermittent transport" performed by the first driving roller 24 each time the drying holding time has elapsed.

When the drying holding time has elapsed since the frame F3 becomes the printing frame, the frame F4 becomes the printing frame through the frame feeding. As a result, the frame F1 is subjected to the colorimetry by the colorimetric unit 20, the frame F2 waits for the colorimetry at the holding cavity platen 32, and the frame F3 is held at the drying platen 28 and is subject to drying. In other words, according to the configuration of FIG. 2, in step S140, the printing colorimetric control unit 12b starts the colorimetry intended for the frame F1 at the timing when the frame F4 is the printing frame.

Figure 7:
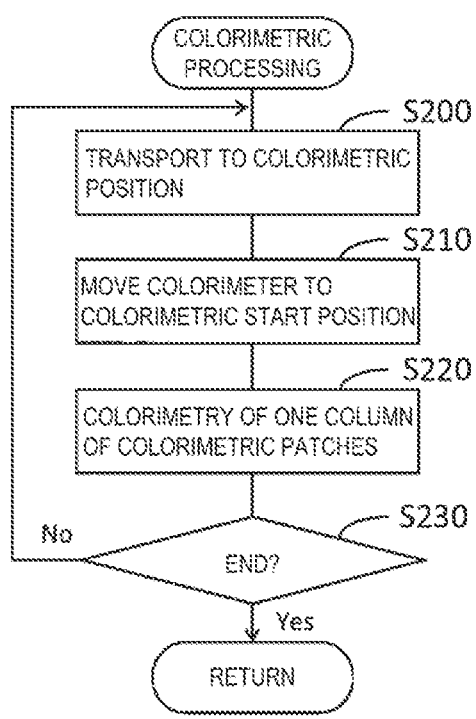
FIG. 7 is a flowchart illustrating colorimetric processing intended for one frame.

FIG. 7 is a flowchart illustrating colorimetric processing of a colorimetric patch intended for one frame. Here, it is assumed that the colorimetry is performed for the frame F1 at the timing when the frame F4 is used as the printing frame. The colorimetric processing of FIG. 7 will be described with reference to FIG. 8.

Figure 8:
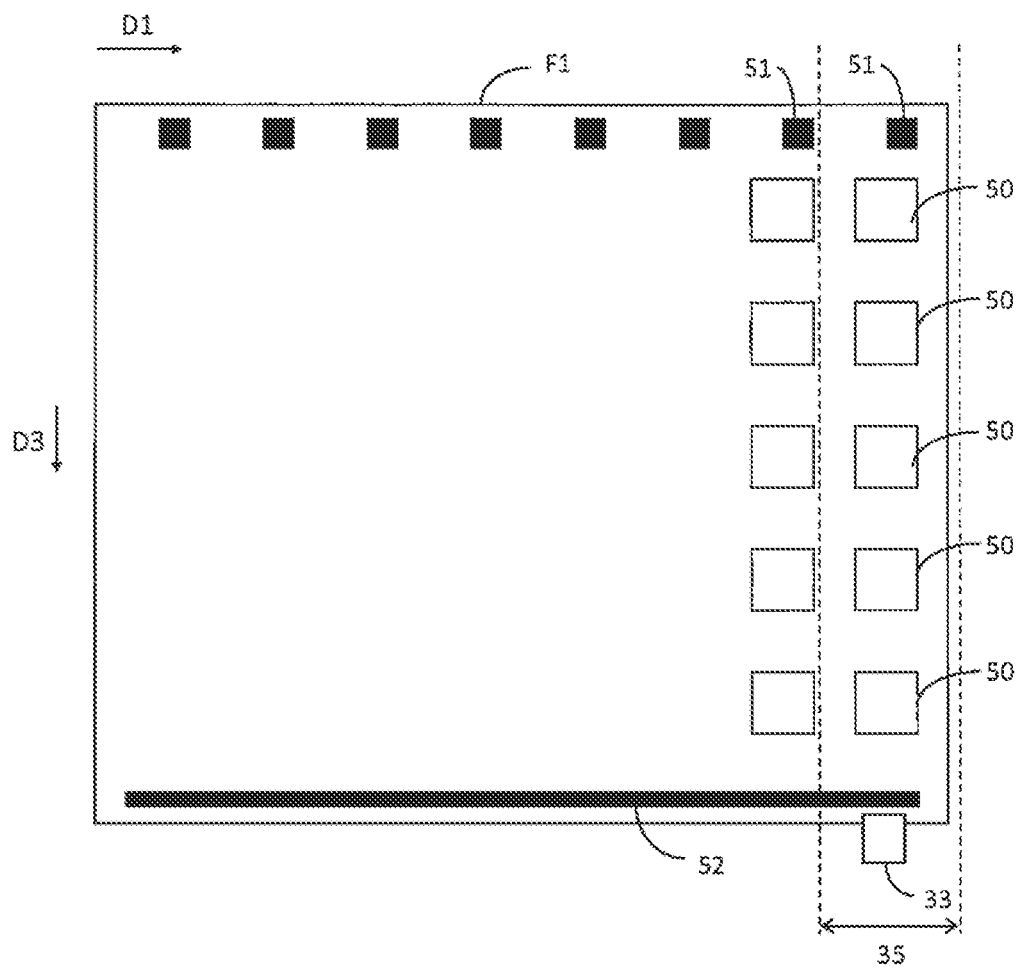
FIG. 8 is a diagram illustrating a frame on which a plurality of colorimetric patches are printed, and a colorimeter.

FIG. 8 illustrates the frame F1 of the printing medium 30 on which the plurality of colorimetric patches 50 are printed by the printing unit 22. The appearance of FIG. 8 is similar to that of FIG. 5. The frame F1 is printed with 10 colorimetric patches 50, which is the color-measurable patch number, based on one frame data in the color chart data. Also, in FIG. 8, the range of the colorimetric platen 35 and the colorimeter 33 are illustrated together.

In step S200, the printing colorimetric control unit 12b rotates the second driving roller 25 of the transport unit 16, and transports the printing medium 30 to a colorimetric position where the colorimeter 33 can perform colorimetry. As illustrated in FIG. 5 and FIG. 8, in the frame, the markings 51 are printed at equal intervals along the transport direction D1 in correspondence with the positions of each column of the colorimetric patches 50. The markings 51 are configured with a specific color, shape, and size, and is detected by a sensor (not illustrated) that the printing apparatus 10 has in the vicinity of the colorimetric platen 35. Accordingly, in step S200, the printing colorimetric control unit 12b transports the printing medium 30 in the transport direction D1 to the second driving roller 25 until the sensor newly detects the marking 51 in the frame intended for colorimetric processing. As a result of the step S200 described above, as illustrated in FIG. 8, one column of the colorimetric patches 50 in the frame F1 is positioned at a position at the colorimetric platen 35 capable of being measured for color by the colorimeter 33.

In step S210, the printing colorimetric control unit 12b moves the colorimeter 33 to a colorimetric start position. As illustrated in FIG. 5 and FIG. 8, in the frame, the long colorimetric initiation bar 52 is printed in the transport direction D1 at a predetermined position separated from the column of the colorimetric patches 50 in the width direction D3. The markings 51 and the colorimetric initiation bar 52 may be printed in advance for each frame of the printing medium 30, or may be printed with the colorimetric patch 50 based on the color chart data. The colorimetric start position is a position in the width direction D3 that exceeds the colorimetric initiation bar 52. In the example illustrated in FIG. 8, the colorimeter 33 is in the colorimetric start position. Steps S200 and S210 may be performed concurrently.

In step S220, the printing colorimetric control unit 12b starts the movement of the colorimeter 33, and causes the colorimeter 33 to performs the colorimetry of the one-column colorimetric patches 50. With reference to FIG. 8, the colorimeter 33 that starts moving in the reverse direction of the width direction D3 from the colorimetric start position performs the colorimetry at a predetermined time interval while continuing to move at a constant speed, starting at the timing of passing through the colorimetric initiation bar 52. As a result, the colorimetry of the plurality of colorimetric patches 50 aligned in one column along the width direction D3 can be performed.

In step S230, the printing colorimetric control unit 12b determines whether the colorimetry of all of the colorimetric patches 50 in the frame that is currently subject to colorimetric processing has ended. The number of colorimetric patches in the frame and the number of columns of the colorimetric patches are known when the color chart data is generated. In the frame F1, the five colorimetric patches 50 in one column are printed in two columns, therefore, the printing colorimetric control unit 12b may determine "No" in step S230 when the colorimetry of the colorimetric patch 50 in the first column has been performed, and may determine "Yes" in step S230 after the colorimetry of the colorimetric patch 50 in the second column is completed.

When the printing colorimetric control unit 12b determines "No" in step S230, the process repeats steps S200 and subsequent steps. As a result, one column of the colorimetric patch 50 that the colorimetry thereof has not yet been performed in the frame is positioned at a position on the colorimetric platen 35 capable of being measured for color by the colorimeter 33, and the colorimetry of the colorimetric patches 50 in this column is performed by the colorimeter 33. A region including such a one-column colorimetric patches 50 can be said to be a one-time colorimetric size due to the reciprocation of the colorimeter 33. In addition, a spacing in the transport direction D1 of each marking 51 corresponding to each column of the colorimetric patches 50 is said to be a "predetermined transport distance" corresponding to the colorimetric size. In other words, apart from the frame feeding by the first driving roller 24, the transport unit 16 performs a "second intermittent transport" in which, each time the colorimeter 33 performs colorimetry by the reciprocation, the second driving roller 25 feeds the print medium 30 in the transport amount adjusting unit 23 and the colorimetric unit 20 in the transport direction D1 by the predetermined transport distance. The transport by the second driving roller 25 including the second intermittent transport may be referred to as, for example, colorimetric feeding, etc.

When the printing colorimetric control unit 12b determines "Yes" in step S230, the colorimetric processing to the currently target frame is ended. Of course, the colorimetry of each colorimetric patch 50 in one frame ends within the drying holding time. When the colorimetric processing is completed in this manner, the printing colorimetric control unit 12b may transport the printing medium 30 to the second driving roller 25 until, for example, the entire frame of interest is moved downstream from the colorimeter 33.

As illustrated in FIG. 2 and FIG. 8, when a frame is used as a printing frame, all or most of the frames to be measured for color at the same time lie in the holding cavity platen 32 of the transport amount adjusting unit 23. For example, when the frame F4 is moved onto the printing platen 26 by the frame feeding to become the printing frame, the frame F1 to be measured for color is located at the holding cavity platen 32 along with all or most of the frame F2 upstream. Then, during the period from when the frame F4 is used as the printing frame until the drying holding time has elapsed, the colorimetric patch is printed on the frame F4 based on the color chart data, and the colorimetric processing illustrated in FIG. 7 is executed on the frame F1.

Therefore, during the period from the time when the frame F4 is the printing frame and the drying holding time has elapsed, the frames F1, F2 move intermittently by the colorimetric feeding described above. At this time, the frame F1, F2 are in a state of being loosened in the holding cavity platen 32, so that even when the frames F1, F2 move downstream, the parts upstream of the frame F2 in the printing medium 30, such as the frames F3, F4, F5, etc., remain stationary. When the drying holding time has elapsed since the frame F4 is the printing frame, the printing intended for the frame F4 and the colorimetry intended for the frame F1 are finished. Then, as a result of the next frame feeding, the frame F5 is located at the printing platen 26, the frame F4 is located at the drying platen 28, the frame F3 waits for the colorimetry at the holding cavity platen 32, and the frame F2 is located at the holding cavity platen 32 and is subject to the colorimetry.

The printing colorimetric control unit 12b repeatedly performs the same processing in the following manner, and when the frame F10, which is the final frame, is the printing frame, the frame F7 is the colorimetric target. Thereafter, the frame feeding is performed for each drying holding time as well, and the colorimetric processing intended for the frame F10 is completed, and the flowchart of FIG. 3 is completed. As is clear from the previous description, in step S140, each frame on which the colorimetric patch in the printing medium 30 is printed is not held at the drying unit 19 for more than the drying holding time. The printing colorimetric control unit 12b stores the colorimetric value generated by the colorimeter 33 by the colorimetry of the colorimetric patch to a predetermined storage destination such as the storage unit 21.

3. SECOND EXEMPLARY EMBODIMENT

Next, a second exemplary embodiment will be described. With respect to the second exemplary embodiment, descriptions common to the exemplary embodiments described above will be omitted as appropriate.

Figure 9:
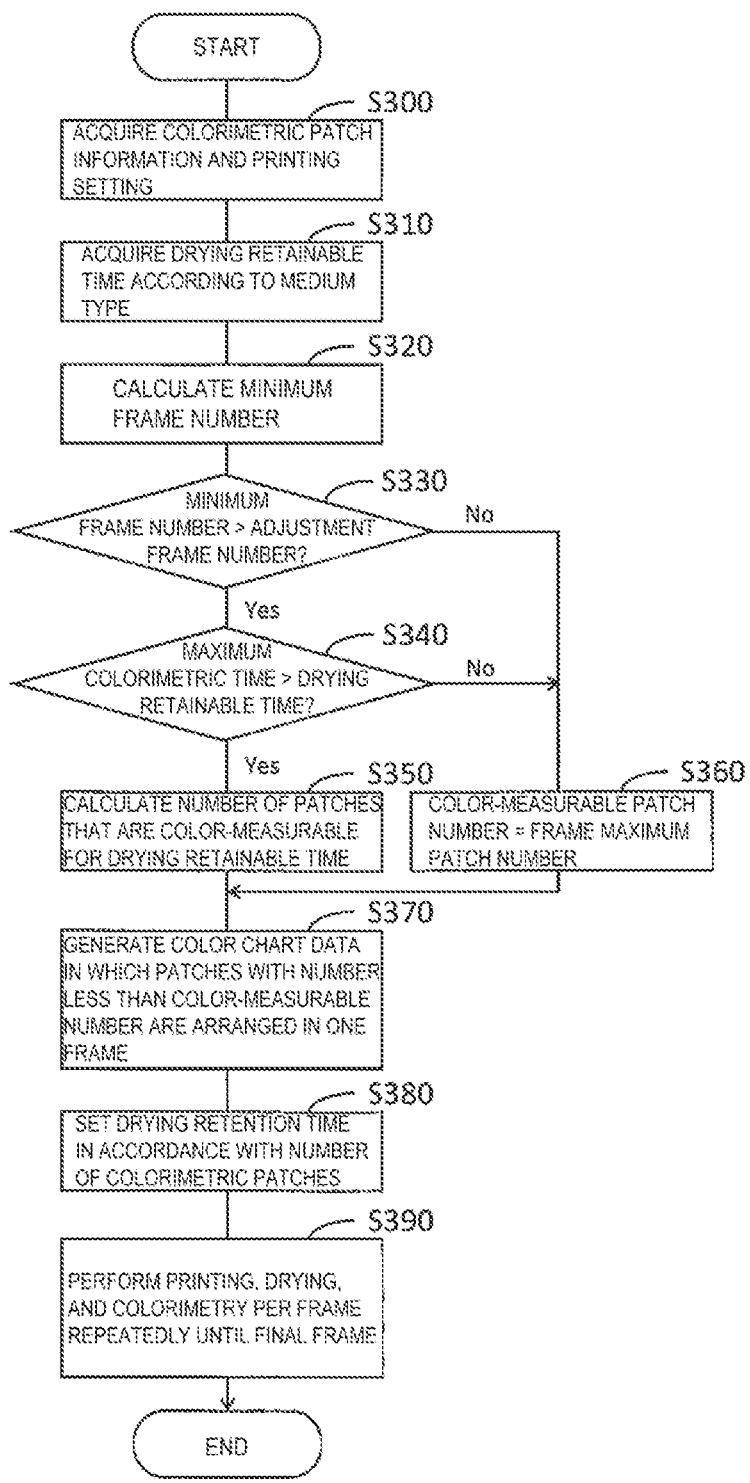
FIG. 9 is a flowchart illustrating printing colorimetric processing of a color chart according to a second exemplary embodiment.

FIG. 9 illustrates printing colorimetric processing of a color chart executed by the control unit 11 according to the program 12 in the second exemplary embodiment by a flowchart. In the flowchart of FIG. 9, steps S300 to S380 correspond to a method of generating color chart data.

Step S300 is the same as step S100 of FIG. 3.

In step S310, the data generation unit 12a acquires a "drying holdable time" in accordance with the type of printing medium 30 included in the printing setting acquired in step S300. The drying holdable time acquired in step S310 is used in each step such as step S340.

The drying holdable time is an upper limit of the time during which the printing medium 30 can be allowed to be held at the drying unit 19. The drying holdable time is predetermined as a time during which the printing medium 30 and the printing result are not damaged, based on the drying capability of the drying unit 19 and the quality of printing and colorimetry. The drying holdable time is also different depending on the type of the printing medium 30.

FIG. 4B illustrates medium characteristic information 41 defining a correspondence relationship between the type of the printing media 30 and the drying holdable time in accordance with this type. The medium characteristic information 41 is stored in advance in the storage unit 21. According to the medium characteristic information 41, the drying holdable time is defined for each type of various printing media 30 that the printing apparatus 10 may use. Accordingly, the data generation unit 12a reads out the drying holdable time corresponding to the type of the printing medium 30 acquired from the printing setting from the medium characteristic information 41 of the storage unit 21. Again, the type of printing medium 30 specified by the printing setting is assumed to be coated paper, and the data generation unit 12a reads out information of "24 second" from the medium characteristic information 41 as the drying holdable time corresponding to the coated paper. Essentially, the drying holdable time is longer than a printing time for one frame.

In step S320, the data generation unit 12a calculates a "minimum frame number", which is a minimum number of frames required for printing the total number of colorimetric patches to be printed. The minimum frame number is also referred to as a minimum region number. The minimum frame number can be obtained by dividing the total number of colorimetric patches to be printed by the frame maximum patch number. In the previous example, the total number of colorimetric patches to be printed=100 and the frame maximum patch number=40, resulting in 100/40=2.5, and then cutting up the decimal point or fewer, resulting in the minimum frame number=3.

In step S330, the data generation unit 12a determines whether the minimum frame number found in step S320 exceeds an "adjustment frame number". Then, when the minimum frame number>the adjustment frame number, the process proceeds from the determination of "Yes" to step S340. When the minimum frame number the adjustment frame number, the process proceeds from the determination of "No" to step S360.

The adjustment frame number is a number of frames that fit in the transport amount adjustment unit 23, and refers to an adjustment region number. The adjustment frame number is obtained by dividing the distance of the transport amount adjustment unit 23 from the drying unit 19 to the colorimetric unit 20 by the one-time transport distance of the frame feeding. The distance of the transport amount adjustment unit 23 from the drying unit 19 to the colorimetric unit 20 is a distance along the holding cavity platen 32, and in the example illustrated in FIG. 2, is a distance along the holding cavity platen 32, which is a V-shaped cavity. The value obtained by dividing the distance of the transport amount adjustment unit 23 from the drying unit 19 to the colorimetric unit 20 by the one-time transport distance of the frame feeding, is rounded down and is referred to as the adjustment frame number. Note that the one-time transport distance of the frame feeding is predetermined in accordance with the distance, etc. of the printing platen 26 and the drying platen 28 in the transport direction D1, and further, the distance of the transport amount adjustment unit 23 from the drying unit 19 to the colorimetric unit 20 is also determined in terms of the structure of the product. Here, in consideration of the above description, it is assumed that the adjustment frame number=2. Note that the frame size and the spacing between the frames of the printing medium 30 are also predetermined in accordance with the one-time transport distance of such frame feeding.

In step S340, the data generation unit 12a acquires a "maximum colorimetric time", which is a time required for the colorimetric unit 20 to measure colors of the colorimetric patches having the frame maximum patch number, and determines whether this maximum colorimetric time exceeds the drying holdable time. According to the example described above, the colorimetric unit 20 has colorimetric performance for measuring colors of the five colorimetric patches at six seconds. Therefore, when the frame maximum patch number=40, the maximum colorimetric time=48 (seconds). When the maximum colorimetric time>the drying holdable time, the data generation unit 12a proceeds from the determination of "Yes" to step S350. When the maximum colorimetric time≤the drying holdable time, the data generation unit 12*a* proceeds from the determination of "No" to step S360.

In step S350, the data generation unit 12*a* calculates a "color-measurable patch number", which is a number of color-measurable patches capable of being measured for color by the colorimetric unit 20 within the drying holdable time. In other words, in the second exemplary embodiment, rather than the number of colorimetric patches capable of being measured for color by the colorimetric unit 20 within the drying holding time equal to the printing time for one frame as in the first exemplary embodiment, the number of colorimetric patches capable of being measured for color by the colorimetric unit 20 within the drying holdable time is referred to as the color-measurable patch number. As in the example described above, when the drying holdable time=24 (seconds), the color-measurable patch number=20 can be calculated in step S350 based on the colorimetric performance of the colorimetric unit 20.

Step S360 will be described. When "No" is determined in step S340, even when the colorimetric patches having the frame maximum patch number are printed on one frame, the time required for the colorimetry does not exceed the drying holdable time. In a case where the maximum colorimetric time is 48 seconds as described above and the drying holdable time is 50 seconds, even when the colorimetric patches having the frame maximum patch number are printed on one frame, there is no problem from the perspective of the damage to the frame held at the drying unit 19. Therefore, when the data generation unit 12*a* determines "No" in step S340, the color-measurable patch number=the frame maximum patch number.

Additionally, when "No" is determined in step S330, at the timing when a color of the frame is to be measured by the colorimetric unit 20, there is no colorimetric patch for drying of the drying unit 19. Therefore, it is not necessary to limit the number of one frame of colorimetric patches in consideration of the longer colorimetric time. However, it is necessary to determine the number of colorimetric patches to be printed on one frame, and it is meaningful to reduce the number of frames used for printing as much as possible. Thus, when the data generation unit 12*a* determines "No" in step S330, the data generation unit 12*a* treats the frame maximum patch number, which is the upper limit of the number of patches that can be printed on one frame, as the color-measurable patch number.

In step S370, similar to step S130, the data generation unit 12*a* generates color chart data for printing a number of colorimetric patches less than or equal to the color-measurable patch number in one frame. As is clear from FIG. 9, step S370 is performed after step S350 or step S360. In step S370 after step S350, the data generation unit 12*a* generates the color chart data in which the number of colorimetric patches per frame is less than or equal to the color-measurable patch number calculated in step S350.

As in the example described above, when it is calculated that the total number of colorimetric patches to be printed=100 and the color-measurable patch number=20 in step S350, the data generation unit 12*a* may generate the color chart data for printing the color chart according to a total of 5 frames in which 20 colorimetric patches are arranged per frame. On the other hand, in step S370 after step S360, the data generation unit 12*a* generates the color chart data in which the number of colorimetric patches per frame is the frame maximum patch number. In this case, the data generation unit 12*a* may print 40 colorimetric patches for each of the frames F1, F2, and generate the color chart data for printing 20 colorimetric patches on the frame F3.

In step S380, the data generation unit 12*a* sets the drying holding time for one frame to be held at the drying unit 19 in accordance with the number of colorimetric patches per frame in the color chart data generated in step S370. The drying holding time is less than or equal to the drying holdable time, and is greater than or equal to the time required for colorimetry by the colorimetric unit 20 of the colorimetric patches per frame in the color chart data.

As in the example described above, in step S370 after S350, when the color chart data is generated in which 20 colorimetric patches having the color-measurable patch number are arranged per frame, the data generation unit 12*a* may set the drying holding time=24 (seconds) in step S380 based on the colorimetric capability of the colorimetric unit 20. Simply in this case, the drying holding time=drying holdable time=the time required for the colorimetry of the colorimetric patches per frame. Of course, if the number of colorimetric patches per frame in the color chart data generated in step S370 is less than the color-measurable patch number, the drying holding time may be set to a time shorter than the drying holdable time in accordance with the time required for the colorimetry of the colorimetric patches per frame.

Furthermore, in step S370 after S360, when the color chart data is generated in which the colorimetric patches having the frame maximum patch number per frame are arranged, the data generation unit 12*a* may set the maximum colorimetric time to the drying holding time in step S380, In this case, the drying holding time=the time required for the colorimetry of the colorimetric patches per frame. Note that, when "No" is determined in step S330, exceptionally, if the drying holdable time is considered to be infinite, the relationship of the drying holdable time≥the drying holding time≥the time required for the colorimetry of the color colorimetric patches per frame is satisfied.

In step S390, similar to step S140, the printing colorimetric control unit 12*b* controls the transport unit 16, the printing unit 22, and the colorimetric unit 20, and repeats the series of processing of printing, drying, and colorimetry of the colorimetric patch based on the color chart data on the frame of the printing medium 30 until the final frame. However, in step S390, the drying holding time is different from step S140. Since the drying holding time employed in step S140 is a printing time for one frame, printing or drying by the printing unit 22 and the drying unit 19 on the frame of each target starts at the same timing and ends at the same timing.

On the other hand, in step S390, the printing colorimetric control unit 12*b* employs the drying holding time set in step S380. As described above, the printing colorimetric control unit 12*b* performs the frame feeding each time the drying holding time has elapsed. Even if the printing time for one frame according to the printing setting is, for example, 12 seconds as described in the first exemplary embodiment, when the drying holding time is, for example, 24 seconds or 48 seconds as the drying holdable time, for example, the printing frame waits for a time period, such as 12 seconds and 36 seconds, at the printing platen 26 until the frame feeding occurs after the printing of the colorimetric patch has ceased. The first exemplary embodiment is also the same as the second exemplary embodiment in that the colorimetry of one frame of the colorimetric patch is finished within the drying holding time. In step S390, each frame on which the colorimetric patch in the printing medium 30 is printed is not held at the drying unit 19 for more than the drying holding time set in step S380.

4. SUMMARY

As described above, according to the first exemplary embodiment, a printing apparatus 10 includes a control unit 11 configured to generate color chart data for printing a color chart including a plurality of colorimetric patches corresponding to a plurality of spot colors, a transport unit 16 configured to intermittently transport a printing medium 30 in a transport direction D1, a printing unit 22 configured to print the colorimetric patches on a processing unit region aligned along the transport direction D1 in the printing medium 30 by attaching a color material to the printing medium 30 based on the color chart data, a drying unit 19 configured to dry the processing unit region in which the colorimetric patches are printed, and a colorimetric unit 20 configured to measure colors of the colorimetric patches in the processing unit region subjected to the drying. Then, the control unit 11 is configured to acquire, based on a printing setting, a drying holding time during which the processing unit region is held at the drying unit 19, calculate a color-measurable patch number that is a number of the colorimetric patches a color of which is measurable by the colorimetric unit 20 within the drying holding time, and generate the color chart data for printing a number of the colorimetric patches in the processing unit region, the number being less than or equal to the color-measurable patch number.

According to the above-described configuration, a number of the colorimetric patches is printed in the processing unit region, the number being less than or equal to the number capable of being measured for color by the colorimetric unit 20 within the drying holding time. Therefore, it is possible to prevent the processing unit region to be dried by the drying unit 19 from being held at the drying unit 19 beyond the drying holding time due to the time required for the colorimetry by the colorimetric unit 20. This makes it possible to prevent the printed medium 30 on which the colorimetric patch has been printed from being damaged by heat and reducing the quality of the printed material. As a result, the colorimetric value of the colorimetric patch obtained by the colorimetric unit 20 is also highly reliable data.

In addition, by acquiring the drying holding time based on the printing setting, the control unit 11 can adjust the degree of effect of the heat on the printing medium 30 from the drying unit 19 to the printing setting such as a printing time.

In addition, when the total number of colorimetric patches to be printed is greater than the color-measurable patch number, the control unit 11 divides the total number of the colorimetric patches into groups of the colorimetric patches, a number of the colorimetric patches per the group being less than or equal to the color-measurable patch number, and generates the color chart data for printing, in group units, the color chart on each of the processing unit regions.

According to the above-described configuration, when a plurality of colorimetric patches greater than the color-measurable patch number are divided into a plurality of processing unit regions in the printing medium 30, it is possible to prevent the processing unit region from being held at the drying portion 19 beyond the drying holding time.

In addition, the printing apparatus 10 may include a transport amount adjustment unit 23 configured to hold the processing unit region before colorimetry between the drying unit 19 and the colorimetric unit 20 in the transport direction D1. Then, the colorimetric unit 20 may be configured to perform colorimetry of the colorimetric patches while the colorimetric unit 20 reciprocates in a direction intersecting the transport direction D1, and the transport unit 16 may be configured to perform a second intermittent transport in which, each time the colorimetric unit 20 performs colorimetry by the reciprocation, the printing medium 30 in the transport amount adjustment unit 23 and the colorimetric unit 20 is fed in the transport direction D1 by a predetermined transport distance corresponding to a colorimetric size of the colorimetry performed each time by the reciprocation, the second intermittent transport being different from the intermittent transport (frame feeding).

According to the above-described configuration, the transport for the purpose of printing or drying of the processing unit region or for retention at the transport amount adjustment unit 23 and the transport for measuring colors of the processing unit region can be controlled separately.

Then, according to the second exemplary embodiment, a printing apparatus 10 includes a control unit 11 configured to generate color chart data for printing a color chart including a plurality of colorimetric patches corresponding to a plurality of spot colors, a transport unit 16 configured to intermittently transport a printing medium 30 in a transport direction D1, a printing unit 22 configured to print the colorimetric patches on a processing unit region aligned along the transport direction D1 in the printing medium 30 by attaching a color material to the printing medium 30 based on the color chart data, a drying unit 19 configured to dry the processing unit region in which the colorimetric patches are printed, a colorimetric unit 20 configured to measure colors of the colorimetric patches in the processing unit region subjected to the drying, and a storage unit 21 configured to store a correspondence relationship between a type of the printing medium 30 and the drying holdable time that is a time during which the printing medium 30 is configured to be held at the drying unit 19 in accordance with the type of the printing medium. Then, the control unit 11 is configured to acquire the type of the printing medium 30 from a printing setting to read out the drying holdable time corresponding to the type of the printing medium 30 from the storage unit 21, calculate a color-measurable patch number that is a number of the colorimetric patches a color of which is measurable by the colorimetric unit 20 within the drying holdable time, generate the color chart data for printing a number of the colorimetric patches in the processing unit region, the number being less than or equal to the color-measurable patch number, and set a drying holding time during which the processing unit region is held at the drying unit 19 to be less than or equal to the drying holdable time and greater than or equal to a time required for colorimetry of a number of the colorimetric patches printed in the processing unit region, the colorimetry being performed by the colorimetric unit 20.

According to the above-described configuration, a number of the colorimetric patches is printed in the processing unit region, the number being less than or equal to the number capable of being measured for color by the colorimetric unit 20 within the drying holding time. Therefore, it is possible to prevent the processing unit region to be dried by the drying unit 19 from being held at the drying unit 19 beyond the drying holdable time due to the time required for the colorimetry by the colorimetric unit 20. This makes it possible to prevent the printed medium 30 on which the colorimetric patch has been printed from being damaged by heat and reducing the quality of the printed material. As a result, the colorimetric value of the colorimetric patch obtained by the colorimetric unit 20 is also highly reliable data.

In addition, by determining the number of colorimetric patches to be printed in the processing unit region based on the drying holdable time, the control unit 11 can suppress the number of processing unit regions used for printing by making the number of patches per processing unit region relatively large while suppressing damage to the printing medium 30.

In addition, according to the second exemplary embodiment, the control unit 11 may be configured to acquire a maximum colorimetric time that is a time required for the colorimetric unit 20 to measure colors of a maximum number of the colorimetric patches configured to be printed in the processing unit region by the printing unit 22, and when the drying holdable time is greater than or equal to the maximum colorimetric time, generate the color chart data for printing the maximum number (frame maximum patch number) of the colorimetric patches in the processing unit region and set the drying holding time to the maximum colorimetric time.

According to the above-described configuration, the control unit 11 can easily determine the number of colorimetric patches to be printed in the processing unit region and the drying holding time in a case where a condition is satisfied where the drying holdable time is greater than or equal to the maximum colorimetric time.

Further, according to the second exemplary embodiment, the control unit 11 is configured to determine whether a minimum region number that is a minimum required number of the processing unit region exceeds an adjustment region number that is a number of the processing unit regions that fit in the transport amount adjustment unit 23, the minimum region number being obtained by dividing the total number of the colorimetric patches to be printed by the maximum number of the colorimetric patches configured to be printed in the processing unit region by the printing unit 22, the adjustment region number being obtained by dividing a distance of the transport amount adjustment unit 23 from the drying unit 19 to the colorimetric unit 20 by a transport distance obtained by a one-time transport of the intermittent transport (frame feeding). Then, in a case where the minimum region number is less than or equal to the adjustment region number, the control unit 11 may be configured to generate the color chart data for printing the maximum number (frame maximum patch number) in the processing unit region, and sets the drying holding time to the maximum colorimetric time that is a time required for the colorimetric unit 20 to measure colors of the maximum number of colorimetric patches.

According to the above-described configuration, the control unit 11 can easily determine the number of colorimetric patches to be printed in the processing unit region and the drying holding time, even in a case where a condition is satisfied where the minimum region number is less than or equal to the adjustment region number.

Note that in the second exemplary embodiment, the steps S320, S330, S340, and S360 may be omitted. In other words, the control unit 11 may proceed to step S350 after step S310.

In addition to the printing apparatus 10, the present exemplary embodiment discloses various categories of disclosures such as the printing system 10, a method for generating the color chart data, the printing colorimetric control method, and the program 12 for causing a processor to execute these methods.

That is, a method for generating color chart data for printing a color chart including a plurality of colorimetric patches corresponding to a plurality of spot colors, the method includes acquiring (step S110), based on a printing setting, a drying holding time during which a processing unit region in a printing medium 30 is held at a drying unit 19, the processing unit region being subjected to each of printing of the colorimetric patches based on the color chart data by a printing unit 22, drying by the drying unit 19, and colorimetry by a colorimetric unit 20 in this order, calculating (step S120) a color-measurable patch number that is a number of the colorimetric patches a color of which is measurable by the colorimetric unit 20 within the drying holding time, and generating (step S130) the color chart data for printing a number of the colorimetric patches in the processing unit region, the number being less than or equal to the color-measurable patch number.

A method for generating color chart data for printing a color chart including a plurality of colorimetric patches corresponding to a plurality of spot colors, the method includes when a region in a printing medium 30 to be subjected to each of printing of the colorimetric patches based on the color chart data by a printing unit 22, drying by a drying unit 19, and colorimetry by a colorimetric unit 20 in this order, is a processing unit region, acquiring (S310) a type of the printing medium 30 from a printing setting to read out a drying holdable time corresponding to the acquired type of the printing medium 30 from a storage unit 21 configured to store a correspondence relationship between the type of the printing medium 30 and the drying holdable time that is a time during which the printing medium 30 is configured to be held at the drying unit 19 in accordance with the type of the printing medium 30, calculating (S350) a color-measurable patch number that is a number of the colorimetric patches a color of which is measurable by the colorimetric unit 20 within the drying holdable time, generating (S370) the color chart data for printing a number of the colorimetric patches in the processing unit region, the number being less than or equal to the color-measurable patch number, and setting (S380) a drying holding time during which the processing unit region is held at the drying unit 19 to be less than or equal to the drying holdable time and greater than or equal to a time required for colorimetry of a number of the colorimetric patches printed in the processing unit region, the colorimetry being performed by the colorimetric unit 20.

5. MODIFICATION EXAMPLES

Modification Example 1

Figure 10:
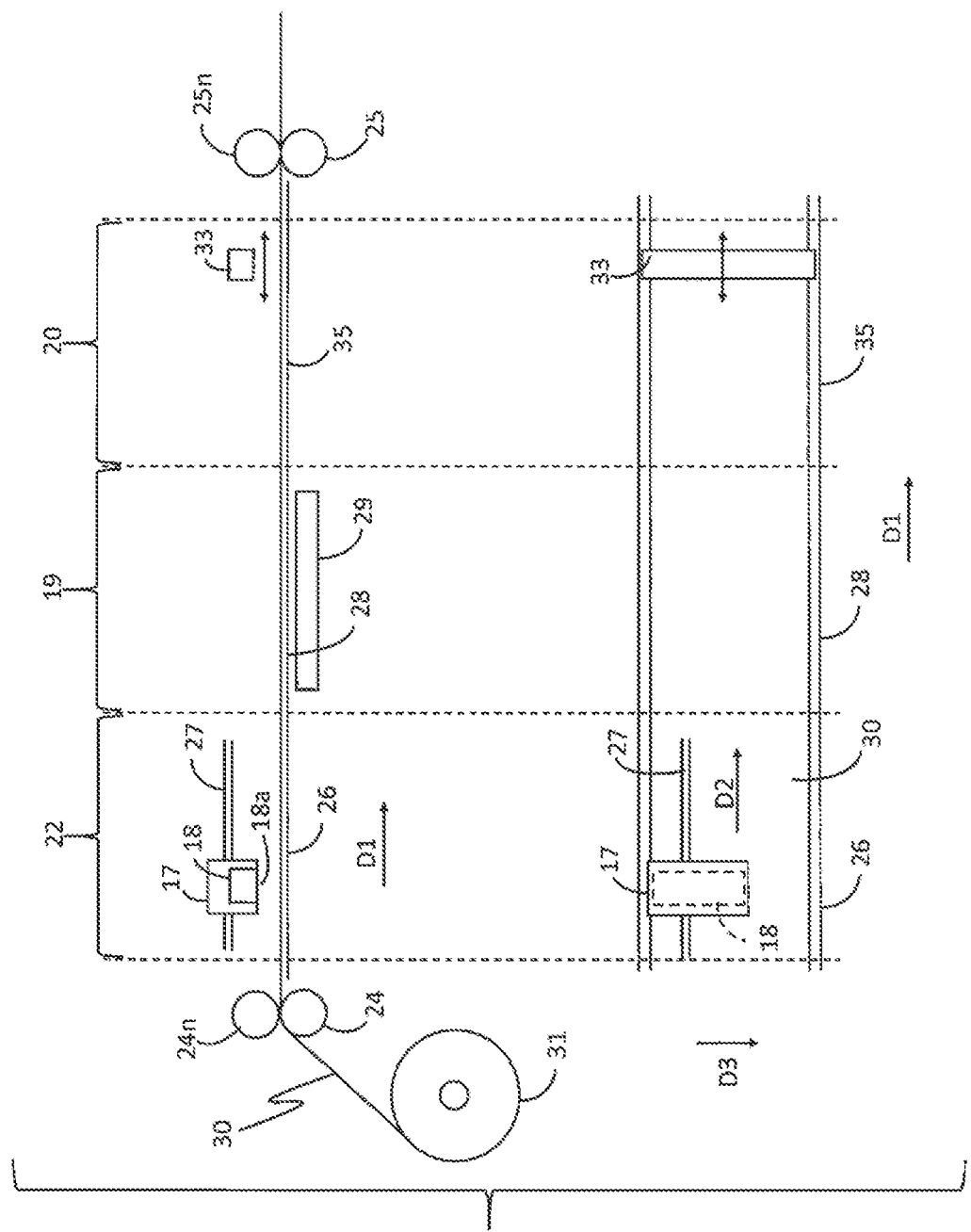
FIG. 10 is a diagram illustrating a specific example different from that illustrated in FIG. 2 of a structure including a printing unit, a drying unit, a colorimetric unit, etc.

FIG. 10 is a specific example of a structure including the printing unit 22, the drying unit 19, the colorimetric unit 20, etc., and is a structure different from that of FIG. 2. The appearance of FIG. 10 is the same as that of FIG. 2. Compared to FIG. 2, there is no transport amount adjustment unit 23 in FIG. 10. The configuration of FIG. 10 is referred to as a modification example 1. In FIG. 10, the colorimetric platen 35 of the colorimetric unit 20 continues downstream from the drying platen 28 of the drying unit 19 as the same or substantially the same surface. With such a configuration, the above-described second intermittent transport is not necessary, and the first driving roller 24 and the second driving roller 25 perform the frame feeding synchronously for each elapse of the drying holding time. Therefore, in the modification example 1, the colorimetric unit 20 performs the colorimetry on a frame that is stationary at the colorimetric platen 35.

In the modification example 1, the colorimeter 33 is a long line sensor in the width direction D3, and can reciprocate on the colorimetric platen 35 along the transport direction D1. Accordingly, the colorimeter 33 performs the colorimetry on a plurality of colorimetric patches that are printed on the frame while moving along the transport direction D1 with the frame fed on the colorimetric platen 35 by frame feeding after drying by the drying unit 19. Of course, in the modification example 1, a number of colorimetric patches capable of being measured for color for the drying holding time or the drying holdable time are printed on one frame based on the colorimetric capability per time of the colorimeter 33. As described above, in the modification example 1, the colorimeter 33 was used as a long line sensor in the width direction D3. However, in a similar manner to that of the first exemplary embodiment, the colorimeter 33 may reciprocate along the guide rail 34 that is parallel with the width direction D3, and the guide rail 34 can reciprocate on the colorimetric platen 35 along the transport direction D1 to have the same function as that of the modification example 1.

Modification Example 2

In the previous description, the carriage 17 on which the printing head 18 is mounted is movable in the main scanning direction D2 parallel to the transport direction D1 and the width direction D3 that intersects with the main scanning direction D1, and the carriage 17 moves in two dimensions to a frame that is stationary on the printing platen 26 to perform printing.

However, the configuration is not limited to such a configuration, and for example, the carriage 17 on which the printing head 18 is mounted may be a mechanism that allows only reciprocation along the width direction D3. In other words, the printing apparatus 10 may be configured to perform printing on the printing medium 30 by passing the printing head 18 with the width direction D3 as the main scanning direction and inter-pass feeding, which is a fixed amount of the transport of the printing medium 30 in the transport direction D1. In the modification example 2, the inter-pass feeding is an intermittent transport by the transport unit 16.

Here, in accordance with the printing setting, it is assumed that the printing unit 20 and the transport unit 16 complete printing on one frame by repeating the combination of the pass of the printing head 18 with the width direction D3 as the main scanning direction and the inter-pass feeding after the pass four times. More specifically, it takes approximately 3 seconds for a one-time pass and one-time inter-pass feeding, and printing on one frame takes 12 seconds. In addition, the printing medium 30 is fed by one-time pass feeding to the downstream by a distance ¼ of the frame length. In this case, assuming that the length of the drying platen 28 in the transport direction D1 is equal to the frame length, one frame after printing is said to pass through the drying platen 28 by requiring 12 seconds for any portion in the frame. Therefore, in the modification example 2, the first exemplary embodiment can be applied as the printing time for one frame=the drying holding time.

What is claimed is:

1. A printing apparatus comprising:
   a control unit configured to generate color chart data for printing a color chart including a plurality of colorimetric patches corresponding to a plurality of spot colors;
   a transport unit configured to intermittently transport a printing medium in a transport direction;
   a printing unit configured to print the colorimetric patches on a processing unit region aligned along the transport direction in the printing medium by attaching a color material to the printing medium based on the color chart data;
   a drying unit configured to dry the processing unit region in which the colorimetric patches are printed; and
   a colorimetric unit configured to measure colors of the colorimetric patches in the processing unit region subjected to the drying, wherein
   the control unit is configured to:
   acquire, based on a printing setting, a drying holding time during which the processing unit region is held at the drying unit;
   calculate a color-measurable patch number that is a number of the colorimetric patches a color of which is measurable by the colorimetric unit within the drying holding time; and
   generate the color chart data for printing a number of the colorimetric patches in the processing unit region, the number being less than or equal to the color-measurable patch number.

2. The printing apparatus according to claim 1, wherein when a total number of the colorimetric patches to be printed is greater than the color-measurable patch number, the control unit divides the total number of the colorimetric patches into groups of the colorimetric patches, a number of the colorimetric patches per the group being less than or equal to the color-measurable patch number, and generates the color chart data for printing, in group units, the color chart on each of the processing unit regions.

3. The printing apparatus according to claim 1, comprising a transport amount adjustment unit configured to hold the processing unit region before colorimetry between the drying unit and the colorimetric unit in the transport direction, wherein
   the colorimetric unit is configured to perform colorimetry of the colorimetric patches while reciprocating in a direction intersecting the transport direction, and
   the transport unit is configured to perform a second intermittent transport in which, each time the colorimetric unit performs colorimetry by the reciprocation, the printing medium in the transport amount adjustment unit and the colorimetric unit is fed in the transport direction by a predetermined transport distance corresponding to a colorimetric size of the colorimetry performed each time by the reciprocation, the second intermittent transport being different from the intermittent transport.

4. A printing apparatus comprising:
   a control unit configured to generate color chart data for printing a color chart including a plurality of colorimetric patches corresponding to a plurality of spot colors;
   a transport unit configured to intermittently transport a printing medium in a transport direction;
   a printing unit configured to print the colorimetric patches on a processing unit region aligned along the transport direction in the printing medium by attaching a color material to the printing medium based on the color chart data;

a drying unit configured to dry the processing unit region in which the colorimetric patches are printed;

a colorimetric unit configured to measure colors of the colorimetric patches in the processing unit region subjected to the drying; and a storage unit configured to store a correspondence relationship between a type of the printing medium and a drying holdable time that is a time during which the printing medium is configured to be held at the drying unit in accordance with the type of the printing medium, wherein the control unit is configured to:

acquire the type of the printing medium from a printing setting to read out the drying holdable time corresponding to the type of the printing medium from the storage unit;

calculate a color-measurable patch number that is a number of the colorimetric patches a color of which is measurable by the colorimetric unit within the drying holdable time;

generate the color chart data for printing a number of the colorimetric patches in the processing unit region, the number being less than or equal to the color-measurable patch number; and set a drying holding time during which the processing unit region is held at the drying unit to be less than or equal to the drying holdable time and greater than or equal to a time required for colorimetry of a number of the colorimetric patches printed in the processing unit region, the colorimetry being performed by the colorimetric unit.

5. The printing apparatus according to claim 4, wherein the control unit is configured to:

acquire a maximum colorimetric time that is a time required for the colorimetric unit to measure a color of a maximum number of the colorimetric patches configured to be printed in the processing unit region by the printing unit, and when the drying holdable time is greater than or equal to the maximum colorimetric time, generate the color chart data for printing the maximum number of the colorimetric patches in the processing unit region and set the drying holding time to the maximum colorimetric time.

6. The printing apparatus according to claim 4, comprising a transport amount adjustment unit configured to hold the processing unit region before colorimetry between the drying unit and the colorimetric unit in the transport direction, wherein the colorimetric unit is configured to perform colorimetry of the colorimetric patches while reciprocating in a direction intersecting the transport direction, and the transport unit is configured to perform a second intermittent transport in which, each time the colorimetric unit performs colorimetry by the reciprocation, the printing medium in the transport amount adjustment unit and the colorimetric unit is fed in the transport direction by a predetermined transport distance corresponding to a colorimetric size of the colorimetry performed each time by the reciprocation, the second intermittent transport being different from the intermittent transport.

7. The printing apparatus according to claim 6, wherein the control unit is configured to:

determine whether a minimum region number that is a minimum required number of the processing unit region exceeds an adjustment region number that is a number of the processing unit regions that fit in the transport amount adjustment unit, the minimum region number being obtained by dividing a total number of the colorimetric patches to be printed by a maximum number of the colorimetric patches configured to be printed in the processing unit region by the printing unit, the adjustment region number being obtained by dividing a distance of the transport amount adjustment unit from the drying unit to the colorimetric unit by a transport distance obtained by a one-time transport of the intermittent transport; and when the minimum region number is less than or equal to the adjustment region number, generate the color chart data for printing the maximum number of the colorimetric patches in the processing unit region, and set the drying holding time to a maximum colorimetric time that is a time required for the colorimetric unit to measure a color of the maximum number of the colorimetric patches.

8. A method for generating color chart data for printing a color chart including a plurality of colorimetric patches corresponding to a plurality of spot colors, the method comprising:

acquiring, based on a printing setting, a drying holding time during which a processing unit region in a printing medium is held at a drying unit, the processing unit region being subjected to each of printing of the colorimetric patches based on the color chart data by a printing unit, drying by the drying unit, and colorimetry by a colorimetric unit in this order;

calculating a color-measurable patch number that is a number of the colorimetric patches a color of which is measurable by the colorimetric unit within the drying holding time; and generating the color chart data for printing a number of the colorimetric patches in the processing unit region, the number being less than or equal to the color-measurable patch number.

9. A method for generating color chart data for printing a color chart including a plurality of colorimetric patches corresponding to a plurality of spot colors, the method comprising:

when a region in a printing medium to be subjected to each of printing of the colorimetric patches based on the color chart data by a printing unit, drying by a drying unit, and colorimetry by a colorimetric unit in this order, is a processing unit region, acquiring a type of the printing medium from a printing setting to read out a drying holdable time corresponding to the acquired type of the printing medium from a storage unit configured to store a correspondence relationship between the type of the printing medium and the drying holdable time that is a time during which the printing medium is configured to be held at the drying unit in accordance with the type of the printing medium;

calculating a color-measurable patch number that is a number of the colorimetric patches a color of which is measurable by the colorimetric unit within the drying holdable time;

generating the color chart data for printing a number of the colorimetric patches in the processing unit region, the number being less than or equal to the color-measurable patch number; and setting a drying holding time during which the processing unit region is held at the drying unit to be less than or equal to the drying holdable time and greater than or equal to a time required for colorimetry of a number of the colorimetric patches printed in the processing unit region, the colorimetry being performed by the colorimetric unit.

* * * * *